United States Patent
Sundaram et al.

(10) Patent No.: US 11,875,308 B2
(45) Date of Patent: Jan. 16, 2024

(54) NORMALIZATION GRID FOR SECURED MULTI-LENDER PLATFORM

(71) Applicant: Capital One Services, LLC, McLean, VA (US)

(72) Inventors: Dinesh Sundaram, Plano, TX (US); Hala Salim El-Ali, Murphy, TX (US); Katelyn Ge, Frisco, TX (US); Alan Ilango, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/411,115

(22) Filed: Aug. 25, 2021

(65) Prior Publication Data

US 2022/0027932 A1 Jan. 27, 2022

Related U.S. Application Data

(63) Continuation of application No. 16/881,918, filed on May 22, 2020, now Pat. No. 11,138,621.

(Continued)

(51) Int. Cl.
*G06Q 10/10* (2023.01)
*G06Q 30/0201* (2023.01)
(Continued)

(52) U.S. Cl.
CPC ......... *G06Q 10/10* (2013.01); *G06F 9/44505* (2013.01); *G06F 9/54* (2013.01); *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01);
(Continued)

(58) Field of Classification Search
CPC .. G06Q 40/025; G06Q 10/10; G06F 16/9558; G06F 16/258; G06F 16/9562; G06F 40/103; G06F 40/174; G06F 40/18
See application file for complete search history.

(56) References Cited

U.S. PATENT DOCUMENTS 6,029,149 A 2/2000 Dykstra et al.
6,208,979 B1 3/2001 Sinclair
(Continued)

FOREIGN PATENT DOCUMENTS

EP 3723341 A1 10/2020
WO 2015136503 A1 9/2015

OTHER PUBLICATIONS

Bluttman, Ken, Using the Excel IF Function: Testing on One Condition, published Mar. 22, 2019 (available at https://www.dummies.com/article/technology/software/microsoft-products/excel/using-the-excel-if-function-testing-on-one-condition-259894/) (Year: 2019).*

(Continued)

*Primary Examiner* — Shahid K Khan
(74) *Attorney, Agent, or Firm* — Sterne, Kessler, Goldstein & Fox P.L.L.C.

(57) ABSTRACT

A multi-lender architecture evaluates applicant data against lending rule sets of multiple lenders. Rule sets provided by different lenders may be expressed differently. The multi-lender architecture transforms the rules in each rule set and represents the rules in a normalization grid. The normalization grid allows a single algorithm to evaluate the rules of different lenders.

20 Claims, 6 Drawing Sheets

US 11,875,308 B2
Page 2

Related U.S. Application Data

(60) Provisional application No. 62/852,202, filed on May 23, 2019.

(51) Int. Cl.

| | | |
|---|---|---|
| G06F 16/955 | (2019.01) | |
| H04L 9/40 | (2022.01) | |
| G06N 20/00 | (2019.01) | |
| G06F 9/54 | (2006.01) | |
| G06F 21/60 | (2013.01) | |
| G06N 3/02 | (2006.01) | |
| G06F 9/445 | (2018.01) | |
| G06F 16/25 | (2019.01) | |
| G06F 21/62 | (2013.01) | |
| H04L 9/08 | (2006.01) | |
| G06Q 20/40 | (2012.01) | |
| G06Q 30/018 | (2023.01) | |
| G06Q 30/0601 | (2023.01) | |
| G06F 40/103 | (2020.01) | |
| G06F 40/174 | (2020.01) | |
| G06F 40/18 | (2020.01) | |
| G06Q 40/02 | (2023.01) | |
| G06F 21/53 | (2013.01) | |
| G06N 5/025 | (2023.01) | |
| G06Q 20/38 | (2012.01) | |
| H04L 67/01 | (2022.01) | |
| G06F 18/24 | (2023.01) | |
| G06Q 40/03 | (2023.01) | |
| G06F 8/65 | (2018.01) | |
| G06F 8/71 | (2018.01) | |
| G06K 7/14 | (2006.01) | |
| G06Q 50/26 | (2012.01) | |

(52) U.S. Cl.
CPC ........ *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(56) References Cited

U.S. PATENT DOCUMENTS

| | | |
|---|---|---|
| 7,107,241 B1 | 9/2006 | Pinto |
| 7,860,767 B1 | 12/2010 | Vinci et al. |
| 8,099,605 B1 | 1/2012 | Billsröm et al. |
| 8,666,885 B1 | 3/2014 | Bramlage et al. |
| 8,924,720 B2 | 12/2014 | Raghuram et al. |
| 9,137,228 B1 | 9/2015 | Newstadt |
| 9,646,172 B1 | 5/2017 | Hahn et al. |
| 9,762,616 B2 | 9/2017 | Nagaratnam et al. |
| 9,965,911 B2 | 5/2018 | Wishne |
| 10,033,702 B2 | 7/2018 | Ford et al. |
| 10,171,457 B2 | 1/2019 | Moore et al. |
| 10,243,945 B1 | 3/2019 | Kruse et al. |
| 2002/0023051 A1 | 2/2002 | Kunzle et al. |
| 2002/0033838 A1* | 3/2002 | Krueger ............ G06F 9/44521 |
| | | 707/999.2 |
| 2002/0040339 A1 | 4/2002 | Dhar et al. |
| 2002/0091629 A1 | 7/2002 | Danpour |
| 2003/0036993 A1 | 2/2003 | Parthasarathy |
| 2005/0086176 A1* | 4/2005 | Dahlgren ............ G06Q 40/02 |
| | | 705/64 |
| 2005/0203834 A1 | 9/2005 | Prieston |
| 2006/0178983 A1 | 8/2006 | Nice et al. |
| 2007/0061248 A1 | 3/2007 | Shavit et al. |
| 2007/0250718 A1 | 10/2007 | Ee et al. |
| 2008/0092240 A1 | 4/2008 | Sitrick et al. |
| 2009/0300474 A1* | 12/2009 | Asplund ............ G06F 9/5072 |
| | | 715/213 |
| 2009/0327196 A1 | 12/2009 | Studer et al. |
| 2012/0017085 A1 | 1/2012 | Carter et al. |
| 2012/0210126 A1* | 8/2012 | Johnson ................ G06F 21/52 |
| | | 713/165 |
| 2012/0246061 A1 | 9/2012 | Ericksen |
| 2012/0254957 A1 | 10/2012 | Fork et al. |
| 2013/0191629 A1 | 7/2013 | Treinen et al. |
| 2014/0006048 A1 | 1/2014 | Liberty |
| 2014/0189123 A1 | 7/2014 | Dodd et al. |
| 2014/0207571 A1 | 7/2014 | Hammock et al. |
| 2014/0237236 A1 | 8/2014 | Kalinichenko et al. |
| 2014/0304170 A1* | 10/2014 | Spotanski ............ G06Q 20/354 |
| | | 705/64 |
| 2015/0026038 A1 | 1/2015 | Alsbrooks |
| 2015/0074407 A1 | 3/2015 | Palmeri et al. |
| 2015/0161364 A1 | 6/2015 | Makarov et al. |
| 2015/0347770 A1 | 12/2015 | Whalley et al. |
| 2017/0091231 A1 | 3/2017 | DiFranco et al. |
| 2017/0244695 A1 | 8/2017 | Lund et al. |
| 2018/0053253 A1 | 2/2018 | Gokhale et al. |
| 2018/0083931 A1 | 3/2018 | Baig et al. |
| 2018/0108105 A1 | 4/2018 | Duesterwald et al. |
| 2018/0158139 A1 | 6/2018 | Krajicek et al. |
| 2018/0218121 A1 | 8/2018 | Gassner et al. |
| 2018/0218159 A1 | 8/2018 | Smith, III et al. |
| 2018/0260576 A1 | 9/2018 | Miguel |
| 2018/0332016 A1 | 11/2018 | Pandey et al. |
| 2019/0238321 A1* | 8/2019 | Park ................ H04N 21/4627 |
| 2020/0067907 A1 | 2/2020 | Avetisov et al. |
| 2020/0153814 A1 | 5/2020 | Smolny et al. |
| 2020/0372211 A1 | 11/2020 | Sundaram et al. |
| 2021/0004479 A1 | 1/2021 | Ithal et al. |

OTHER PUBLICATIONS

Bluttman, Ken, Using the Excel IF Function: Testing on One Condition (Year: 2019).*

Bluttman, Ken, "Using the Excel IF Function: Testing on One Condition" (Mar. 22, 2019) (Available at https://www.dummies.com/article/technology/software/microsoft-products/excel/using-the-excel-if-function-testing-on-one-condition-259894/) (Year: 2019).*

Cheusheva, "Using IF function in Excel: formula examples for numbers text, dates, blank cells" (Apr. 27, 2017) (Available at https://web.archive.org/web/20170420035257/https://www.ablebits.com/office-addins-blog/2014/11/26/if-function-excel) (Year: 2017).*

Cheusheva, "Excel IF function: nested IF formulas with multiple conditions, IFERROR, IFNA and more" (Apr. 27, 2017) (Available at https://web.archive.org/web/20170420035147/https://www.ablebits.com/office-addins-blog/2014/12/03/excel-if-function-iferrror-ifna/) (Year: 2017).*

NPL Search (Google Scholar) (Year: 2020).

N. Naik and P. Jenkins, "Securing digital identities in the cloud by selecting an apposite Federated Identity Management from SAML, OAuth and OpenID Connect," 2017 11th International Conference on Research Challenges in Information Science (RCIS), Brighton, UK, 2017, pp. 163-174. (Year: 2017).

(56) References Cited

OTHER PUBLICATIONS

Oasis. "Security Assertion Markup Language (SAML) V2.0 Technical Overview", Sep. 2005. (Year: 2005).

* cited by examiner

| Unique Name 301 | FICO >= 302 | FICO < 303 | LTV<= 304 | Income > 305 | Credit 306 | Priority 308 |
|---|---|---|---|---|---|---|
| Rule1 | 640 321 | 660 322 | 130 323 | 50000 324 | 10 325 | 2 |
| Rule2 | 620 | 640 | 110 | 50000 | 20 | 1 |
| Rule3 | | | 80 326 | 50000 327 | 30 328 | 3 |
| Rule_n | | | | | 100 | 4 |

NORMALIZATION GRID FOR SECURED MULTI-LENDER PLATFORM

CROSS-REFERENCE TO RELATED APPLICATIONS AND INCORPORATION BY REFERENCE

This is a Continuation Application of U.S. application Ser. No. 16/881,918, filed on, May 22, 2020, which claims priority to U.S. Provisional Application No. 62/852,202, filed on May 23, 2019. The contents of each of the applications is incorporated by reference in their entirety.

BACKGROUND

Most vehicle purchases involve financing, which increases the total cost of the vehicle because, in addition to the price of the vehicle, the consumer is paying for the cost of credit (interest and ancillary costs). In making such a purchase, the consumer has an incentive to minimize these additional costs. Typically, consumers obtain automobile financing for the purchase of a vehicle of interest upon visiting a dealer. At such a visit, dealers often run credit checks on the consumer, to check the consumer's credit in deciding whether to offer a loan. Even if the consumer is approved for a bank loan, communications are often not integrated with a third-party lender. That is, the consumer faces the added inconvenience of having to communicate with two separate parties to complete the purchase of the vehicle.

BRIEF SUMMARY

A method of transforming lending rules into a common format may include receiving, at a server, a first rule from a client device, wherein the first rule includes an outcome variable, and an outcome value. The method may further include creating a normalization grid. The normalization grid may include a header row including an identification of the outcome variable, a first column associated with the outcome variable, and a first row corresponding to the first rule. The first row may include the outcome value in the first column.

The first rule may further include a first test. The first test may include a test variable, a first comparison operator, and a first comparison value. The normalization grid may further include a second column associated with the test variable and the first comparison operator. The first row may further include the first comparison value in the second column.

The method may further include receiving a variable identifier and a test value corresponding to a lending inquiry, and evaluating the test value against the normalization grid based on the variable identifier. The evaluating may include identifying a column based on the variable identifier corresponding to the test variable, and comparing the test value to the comparison value in the first row at the identified column using the comparison operator associated with the identified column. The method may further include applying the outcome value of the first row to the outcome variable associated with the outcome value, and generating a lending response based on the outcome value.

The method may further include receiving a second rule from the client device and adding a second row to the normalization grid corresponding to the second rule. The method may further include evaluating rules of the normalization grid according to a defined sequence and generating the lending response in response to satisfying a rule by the test value and the variable identifier.

The outcome value may correspond to a number of basis points, and the generating of the lending response may include determining an annual percentage rate (APR) based on a base rate and the number of basis points. The lending response may include the determined APR.

The first rule further comprises a second comparison operator and a second comparison value. The normalization grid may further include a third column associated with the test variable and the second comparison operator. The first row may further include the second comparison value in the third column.

One or more columns in the normalization grid may each correspond to a respective test pair identifying a variable and a comparison operator. A row, corresponding to a rule of the normalization grid, may include a null value at a column corresponding to a test pair that is undefined by the rule.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

FIG. 3 is a diagram illustrating a representation of several rules in the normalization grid according to some embodiments disclosed herein.

In the drawings, like reference numbers generally indicate identical or similar elements. Additionally, generally, the left-most digit(s) of a reference number identifies the drawing in which the reference number first appears.

DETAILED DESCRIPTION

Figure 1:
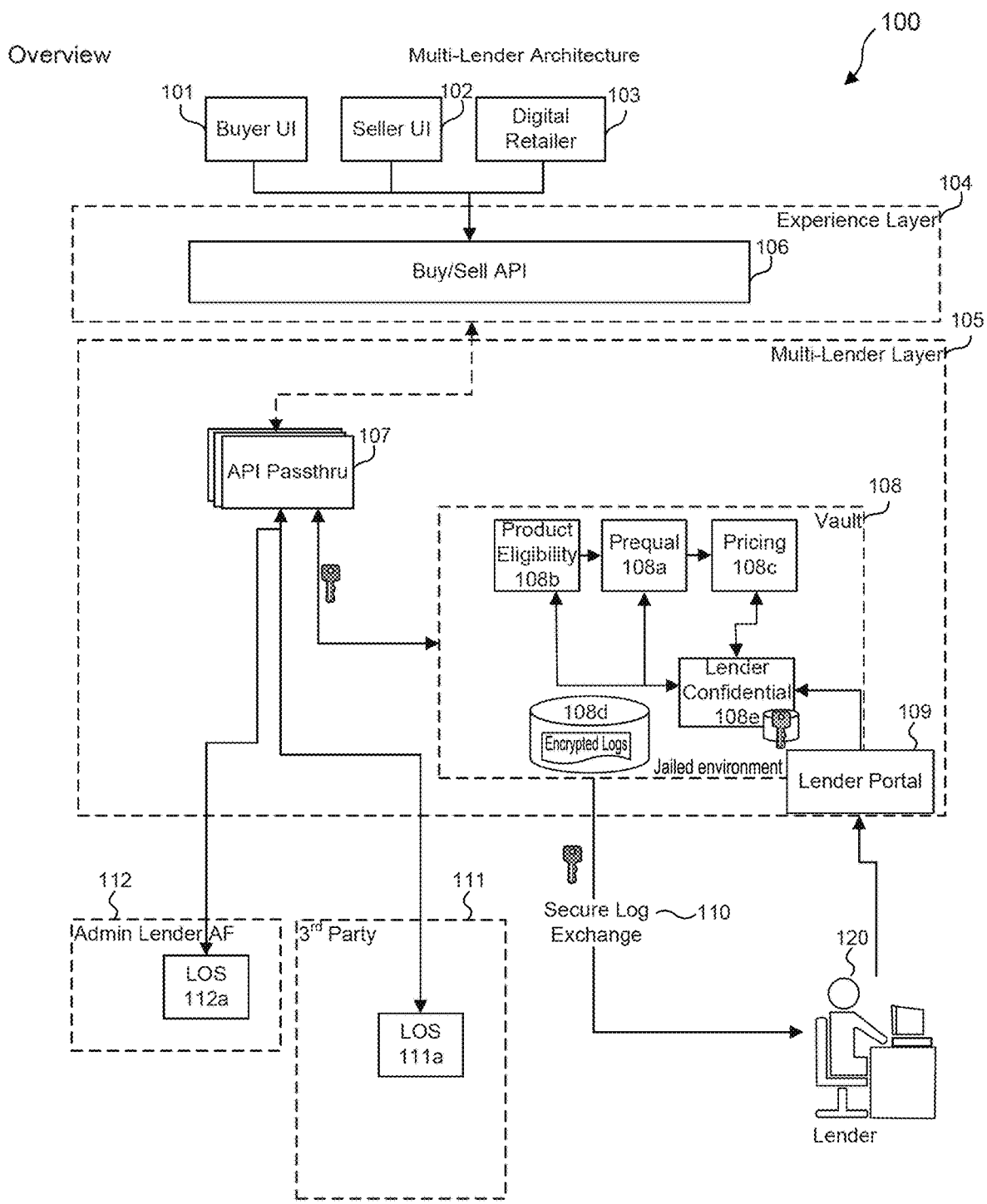
FIG. 1 is a block diagram of a multi-lender architecture according to an embodiment.

The disclosed embodiments relate to a lender portal 109 that interfaces with a multi-lender architecture 100 configured to provide loan applicants with automated pre-qualification and eligibility evaluation for multiple candidate lenders. The multi-lender architecture may evaluate applicant information against lender rule sets to determine whether the applicant is eligible for a loan and/or to determine pricing information for a loan with each lender. According to some embodiments, the multi-lender architecture 100 is configured to provide these functions in relation to automobile loans.

A loan applicant may submit a loan application to the multi-lender architecture 100 for evaluation based on the lending criteria of multiple lenders participating in a lending market created using the multi-lender architecture 100. The multi-lender architecture 100 may receive rule sets for evaluating loan applications from each lender. Each lender may provide a different rule set to the multi-lender architecture 100 and rule sets received from different lenders may be formatted or expressed in different ways.

When operating independently of the multi-lender architecture, each lender may choose to implement a customized computer system configured to evaluate applicant data against that lender's rule sets. Each lender may decide how it formats and represents rule sets and, therefore, the customized computer system operated independently by each lender, may be configured to operate only on rule sets formatted and represented according to that lender's unique decisions.

However, a multi-lender architecture 100 is necessarily a more generalized solution to the problem of evaluating applicant data against multiple lender rule sets. The implementation of a multi-lender architecture 100 on a computer system creates a technological problem related to evaluating applicant data against many different lender's rule sets that each may be formatted and represented in a different manner. Because the technological problem is created by implementing the multi-lender architecture 100 using a computer system, the solution is also rooted in computer technology. One possible solution to this problem is to code a separate algorithm for evaluating each lender's rule sets. The coding of a separate algorithm for evaluating lender rule sets would become part of the onboarding process of a new lender, increasing the amount of work required for a new lender to join the multi-lender architecture.

A more elegant solution is to create a method of normalizing separate lender rules into a common format and representation that enables using a single rule set evaluation algorithm capable of operating on all lenders' rule sets. According to the disclosed embodiments, the common format may include a normalization grid. The normalization grid allows a single algorithm to evaluate a loan application for all lenders participating in the multi-lender architecture 100 even when the rule sets are received in different formats. The embodiments described herein create an improvement in the functioning of the computer system that solves the problem of evaluating different lender rule sets.

FIG. 1 is a block diagram of a multi-lender platform architecture According to some embodiments. The lender portal 109 may address the need for lenders to securely upload and manage sensitive lender data or Intellectual Property (IP) data. Sensitive lender data may be any data related to trade secrets, proprietary data, private data, or any data the lender desires not to be made available to competitors. Sensitive lender data may include pricing policies, lender policies, dealer relationships, lending decision criteria, vehicle eligibility criteria, configuration information, or operational data, such as logging data, auditing data, data required by law to be kept private, or any other data generated from operations performed in the multi-lender architecture 100. Some sensitive lender data may be stored and/or processed in the vault 108. Within the vault 108, sensitive lender data may be stored in a lender confidential repository 108e or in a secure location for encrypted logs 108d. Transmission of sensitive data can be accomplished via secure log exchange 110 to a user.

The lender portal 109 may also manage security keys used for encrypting and decrypting sensitive lender data. Although the lender portal 109 is illustrated within the multi-lender layer 105 of the multi-lender architecture 100, any of the functions of the lender portal 109 may be performed at the multi-lender layer 105 or at a lender 120 terminal.

The lender portal 109 may also provide access to the multi-lender architecture 100 that ensures segregation or isolation of lender data in order to address legal issues related to anti-competitive and antitrust requirements. The authentication and authorization mechanism of the lender portal 109 ensures appropriate attribution, auditing, and non-repudiation capabilities are available.

Sensitive lender data may be encrypted when sent to/from the lender portal 109 using an encryption service. The encryption service may be implemented using various encryption protocols. Encryption keys may be unique to each lender 120 using the lender portal 109. The unique encryption keys corresponding to each lender 120 may be used to encrypt and decrypt the sensitive lender data corresponding to each lender 120 using the lender portal 109. For example, a first lender may be associated with a first set of encryption keys and a second lender may be associated with a second set of encryption keys that are different from the first set of encryption keys. The first lender can view the first lender's sensitive lender data, but not the second lender's sensitive lender data and the second lender can view the second lender's sensitive lender data but not the first lender's sensitive lender data. Encryption of all sensitive lender data sent to/from the lender portal 109 may ensure that no lender has access to another lender's sensitive lender data. Even if a first lender 120 or third-party were to gain access to a second lender's sensitive lender data, the second lender's sensitive lender data is encrypted using the second lender's keys and unreadable to the first lender or third-party without those keys.

The lender portal 109 may be a self-service portal for lenders 120 that integrates tools for policy management, dealer list management, encryption key management, user access management, etc., while providing secure isolation and segregation of sensitive lender data, performance metrics, and operational data. The lender portal 109 may be a one-stop integrated tool that enables the activities that a lender 120 may be required to perform as part of interacting with the multi-lender architecture 100. The following are features and activities the lender portal 109 may assist in, provide, or enable: secure access controls to ensure a federated identity framework, allowing lenders 120 to use their existing Single Sign-On (SSO); configuration tools that enable lenders 120 to securely upload and manage sensitive lender IP data, such as pricing policies, dealer relationships, lending decision criteria, and vehicle eligibility criteria; security management tools that allow the lender to create and manage various encryption keys required to interact with the multi-lender architecture 100; and lifecycle tools that enable lenders 120 to view encrypted operational data applicable specifically to the lender 120, such as metrics, application logs, and audit data.

Encrypted data may be made accessible only to authorized personnel, such as the lender 120, with access to the appropriate encryption keys. Encrypted operational data may be sent to the lender portal 109, and the lender portal 109 may decrypt the data, using keys managed by the lender portal 109, and display the decrypted data on the lender's terminal. Each lender 120 may be assigned unique encryption keys so that no lender 120 can gain access to another lender's proprietary data. Encryption may be performed using Secure Sockets Layer (SSL), encryption methods described in this or related applications, or other known encryption methods. According to an embodiment, each payload of sensitive lender data may be encrypted by a unique encryption key in addition to any encryption that occurs in a standard HTTPS connection.

In some embodiments, the multi-lender architecture 100 may include a plurality of interactive micro-services that communicate with one another in a bi-directional manner to create a normalized process for purchasing and financing a product, such as a vehicle. The normalized process may include prequalifying one or more applicants for a loan with a plurality of lenders to purchase the product and calculating pricing details for each loan that would be offered by each lender based on an applicant's credentials. In some aspects, the pricing may be for a specific vehicle selected by the applicant or across a range of vehicles available in an inventory. Availability of a vehicle for each lender may vary based on relationships between each lender and associated dealerships or lender specific policies based on credit score, vehicle, geography, etc. That is, the multi-lender architecture 100 may provide for an end-to-end architecture that tailors applicant-specific credentials that are analyzed against lender specific requirements, and performs the analysis to guide the applicant and lenders through the steps of pre-qualifying the applicant, determining vehicle eligibility, determining vehicle pricing, and providing a credit application from the applicant to a selected lender.

As illustrated in FIG. 1, the multi-lender architecture 100 may include an experience layer 104 and a multi-lender layer 105. In some embodiments, the experience layer 104 may be accessed via numerous user interfaces (UIs), which may be executed on a client device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. For example, the UIs may include buyer UI 101, seller UI 102, and/or digital retailer UI 103. In some embodiments, an applicant may use a personal client device to log in to the multi-lender architecture 100 using the buyer UI 101 or the digital retailer UI 103. Similarly, a dealer or digital retailer may use a client device to log in to the multi-lender architecture 100 using the seller UI 102. After logging in, the applicant or the dealer may interact with the multi-lender architecture 100 via the experience layer 104, through a Buy/Sell application programming interface (API) 106. For example, the experience layer 104 may display information to the applicant, dealer, or digital retailer in a lender agnostic format. That is, information may be displayed to the applicant, dealer, or digital retailer on the client device in a universal, applicant-friendly format using the experience layer 104. For example, the information may include application forms, prequalification results from lenders, pricing on eligible vehicles for purchase, or the like. In some embodiments, the experience layer 104 may communicate with the multi-lender layer 105. For example, an API Passthru 107 of the multi-lender layer 105 may communicate with the Buy/Sell API 106 of the experience layer 104.

In some embodiments, the multi-lender architecture 100 may be associated with a financial institution (e.g., bank or lender), which may provide its own lending platform 112. The lending platform 112 may include a loan origination system 112a. In some embodiments, the UIs 101-103 may communicate back and forth with the loan origination system 112a to generate a loan offer from the financial institution via the Buy/Sell API 106 and the API Passthru 107. In some embodiments, the lending platform 112 may receive rule sets, from the financial institution, for prequalifying an applicant, determining product eligibility, and determining pricing for the product. In some embodiments, the UIs 101-103 may communicate in parallel with the vault 108 and with the loan origination system 112a to generate a loan offer from the financial institution, as discussed below. The loan offers from the lending platform 112 may be presented alongside the loan offers from third-party lenders 111 on the UIs 101-103.

In some embodiments, the multi-lender architecture 100 may include a third-party API 111 including a third-party loan origination system 111a. When a lender does not upload to the multi-lender architecture 100, rule sets associated with pre-qualification, vehicle eligibility, and pricing, the third-party loan origination system 111a may generate a loan offer for the lender. The third-party loan origination system 111a may communicate with the UIs 101-103 via the Buy/Sell API 106 and the API Passthru 107 to generate a loan offer, in parallel, with the micro-processes (e.g., pre-qualification microservice 108a, product eligibility microservice 108b, and pricing microservice 108c). The loan offers from the third-party API may be presented alongside the loan offers from the other lenders on the UIs 101-103.

As shown in FIG. 1, the multi-lender layer 105 may include the vault 108, which may include a prequalification microservice 108a, a product eligibility microservice 108b, a pricing microservice 108c, an encrypted log (e.g., a data repository) 108d, and a lender confidential repository 108e. It should be understood, by those of ordinary skill in the art, that these microservices and repositories are merely examples, and that the multi-lender architecture 100 may include other microservices and repositories in accordance with aspects of the present disclosure. In some embodiments, the vault 108 may be accessed by a plurality of lenders 120 (only one shown in FIG. 1) using a lender portal 109 to provide one or more proprietary rule sets for pre-qualifying an applicant, determining vehicle eligibility for financing, and determining pricing information for each eligible vehicle.

Rule sets may include pre-qualification rules, loan eligibility rules, lending rules, filing policies, lending policies or any criteria or sensitive lender data used to assess applicant data and generate lending decisions within the vault 108. The vault 108 may process the prequalification, vehicle eligibility, and pricing information associated with building a loan offer for multiple lenders, in parallel, using the rule sets provided by each lender.

Additionally, as the vault 108 processes the information for multiple lenders 120, the loan origination system 112a and/or third-party loan origination system 111a may simultaneously process the loan application. In this way, the multi-lender architecture 100 may assess applicant eligibility and vehicle eligibility, as well as pricing for eligible vehicles (e.g., personalized interest rates and monthly payments), for any number of lenders in parallel. The vault 108 may reside in a jailed, self-contained network, configured to receive and transmit data in an encrypted format. In some embodiments, the vault 108 may be a multi-tenant arrangement within a larger multi-tenant arrangement. In this self-contained network, lenders may manage their own separate accounts. Each lender may securely manage its loan eligibility rules, lending rules, filing policies, and/or the like. Lenders may view their own data inside the vault 108 and may not view data associated with other lenders. Furthermore, data inside the vault 108 may not be visible to consumers through the UIs 101-103, or any other interface.

According to an embodiment, the lender portal 109 is configured to receive sensitive lender data, such as a new configuration or new lending policies, and a start time identifying a date and/or a time at which the new configuration or new lending policies should go into effect. The vault 108 may be configured to switch to the new configuration or new lending policies at the date and/or time identified by the start time.

Figure 2:
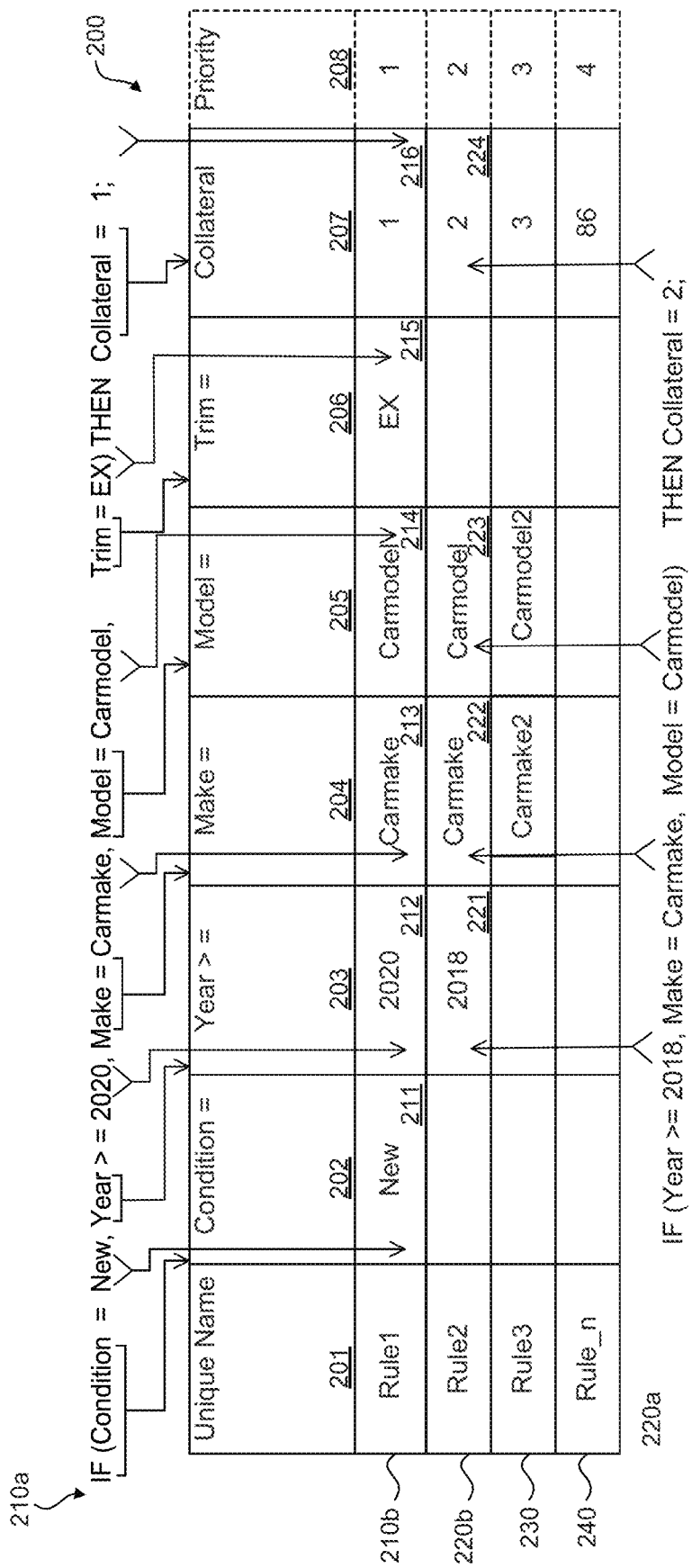
FIG. 2 is a diagram illustrating a relationship between a rule and the expression of the rule in the normalization grid according to some embodiments disclosed herein.

FIG. 2 is a diagram illustrating a relationship between a rule and the expression of the rule in the normalization grid 200 according to some embodiments disclosed herein.

According to a non-limiting example, a rule set provided by a lender may include multiple rules. A first rule 210a is illustrated in FIG. 2. In a non-limiting example, the first rule 210a may be expressed as an IF THEN statement:

IF (Condition=New, Year>=2020, Make=Carmake, Model=Carmodel, Trim=EX)
THEN Collateral=1

Each rule may include one or more tests. A test may be a logical expression that may evaluate to a logical TRUE or FALSE result. A test may include a test variable, a comparison operator, and a comparison value. The test variable may identify applicant data that is compared to the comparison value using the comparison operator in the process of evaluating a lending application.

In the first rule 210a, "Condition=New" represents a test. In the test "Condition=New" of the first rule 210a, "Condition" is the test variable, "=" is the comparison operator, and "New" is the comparison value. Other tests included in the first rule 210a include "Year>=2020", "Make=Carmake", "Model=Carmodel", and "Trim=EX". A rule may have any number of tests, including zero. A rule with zero tests may function as a catch-all rule that is applied by default when no other rules are satisfied by the application data included in a lending inquiry. The tests may be related to any criteria the lender uses for determining loan eligibility, loan terms, or lending decisions, and a skilled person would understand that the rule sets, rules, and tests of any rule are not limited to those illustrated in FIG. 2.

A rule may also include at least one outcome. The figures show a single outcome for illustration purposes only and there is no reason why multiple outcomes cannot be associated with a single rule. An outcome may include an outcome variable and an outcome value. In the first rule 210a, "Collateral" is the outcome variable, and "1" is the outcome value. Collateral, as an outcome variable, may express a score related to the characteristics of the vehicle that provides collateral for the loan application. According to some embodiments, a rule may include more than one outcome and all outcomes included in the rule may be applied when the rule is satisfied.

The multi-lender architecture 100 may receive the first rule 210a, as a non-limiting example, and transform the first rule 210a into a format that can be represented in the normalization grid 200. According to some embodiments, the normalization grid 200 may include a unique identifier column 201 and an outcome column 207. The unique identifier uniquely identifies the rule, and any method of uniquely identifying the rule may operate as a unique identifier. According to some embodiments, the unique identifier may be a unique name, a unique number, or a unique sequence of alphanumeric characters assigned to the rule. According to some embodiments, a rule may be uniquely identified by the row in the normalization grid 200 that represents the rule, and the creation of a unique identifier and a column associated with the unique identifier is optional. In the non-limiting example illustrated in FIG. 2, the first rule 210a may be transformed and stored in a first row 210b of the normalization grid. The first rule 210a may be assigned a unique identifier, "Rule1", which may be stored in a first row 210b at the "unique identifier" column 201 of the normalization grid 200. The outcome column 207 may be associated with the "collateral" outcome variable and the outcome column 207 is labeled "Collateral", which may correspond to the lender-specific collateral outcome to be applied when a rule is satisfied. The lender-specific collateral outcome includes the result applied to or included in a lending decision based on the collateral details in the application data. The collateral may include the vehicle for which the applicant is seeking financing. The outcome column 207 of the first row 210b of the normalization grid 200 may store the outcome "1" 216 of the first rule 210a. The tests included in the first rule 210a ("Condition=New", "Year>=2020", "Make=Carmake", "Model=Carmodel", and "Trim=EX") may be represented in the normalization grid 200 through a combination of the additional columns 202, 203, 204, 205, 206 and the contents of the additional columns in the first row 210b.

In FIG. 2, the first rule 210a includes the tests "Condition=New", "Year>=2020", "Make=Carmake", "Model=Carmodel", and "Trim=EX". According to some embodiments, each of the tests in a rule may be stored in the normalization grid by splitting the tests into two parts: a first part may include the test variable and the comparison operator from the test, and a second part may include the comparison value from the test. An additional column may be created in the normalization grid and associated with the test variable and the comparison operator. The comparison value may be stored in the additional column, in the row of the normalization grid 200 corresponding to the rule.

The first rule 210a illustrates how the tests included in a rule may be transformed and represented in the normalization grid 200. As a non-limiting example, the "Condition=New" test may be split into two parts: "Condition=" and "New". The test variable, "Condition", and the comparison operator, "=", may be associated with a first additional column 202 of the normalization grid 200. The comparison value, "New" 211, may be stored in the first row 210b at the first additional column 202. Associating a test variable and a comparison operator with an additional column of the normalization grid may be performed in a variety of ways. This includes, but is not limited to, labeling the additional column with the test variable and the comparison operator, storing the test variable and the comparison operator in a header row of the normalization grid, storing the test variable in a first header row and storing the comparison operator in a second header row of the normalization grid, or setting attributes of the additional column to identify the test variable and the comparison operator.

Similar to the "Condition=New" test of the first rule 210a, the "Year>=2020" test of the first rule 210a may be transformed and represented in the normalization grid. This may occur by associating the test variable, "Year", and the comparison operator, ">=", with a second additional column 203, and storing the comparison value "2020" 212 in the first row 210b at the second additional column 203. The "Make=Carmake" test of the first rule 210a may be transformed and represented in the normalization grid 200 by associating the test variable "Make" with a third additional column 204, associating the comparison operator "=" with the third additional column 204, and storing the comparison value "Carmake" 213 in the first row 210b at the third additional column 204. The "Model=Carmodel" test of the first rule 210a may be transformed and represented in the normalization grid 200 by associating the test variable "Model" and comparison operator "=" with a fourth additional column 205 and storing the comparison value "Carmodel" 214 in the first row 210b at the fourth additional column 205. The "Trim=EX" test of the first rule 210a may be transformed and represented in the normalization grid 200 by associating the test variable "Trim" and comparison operator "=" with a fifth additional column 206 and storing the comparison value "EX" 215 in the first row 210b at the fifth additional column 206.

As illustrated in FIG. 2, the first rule 210a may be associated with a first row 210b of the normalization grid 200. The first rule 210a may be divided into several parts and each part may be associated with a different column of the normalization grid 210. The outcome may be associated with an outcome column 207 of the normalization grid 200. Each of the tests included in the first rule 210a may be associated with additional columns 202, 203, 204, 205, 206 of the normalization grid. The comparison values 211, 212, 213, 214, 215 of each test of the first rule 210a may be stored in the first row 210b at an appropriate one of the additional columns 202, 203, 204, 205, 206 of the normalization grid 200. The first rule 210a may be given a unique identifier, "Rule1", associated with a "unique identifier" column 201 of the normalization grid 200.

FIG. 2 also illustrates transforming and representing a second rule 220a in the normalization grid 200. In a non-limiting example, the second rule 220a may be expressed as an IF THEN statement:

IF (Year>=2018, Make=Carmake, Model=Carmodel)
THEN Collateral=2.

The second rule 220a may be represented in a second row 220b of the normalization grid. The second rule 220a may be assigned the name "Rule2", which may be stored in the "unique identifier" column 201 of the normalization grid. The outcome variable "Collateral" is the same for both the first rule 210a and the second rule 220a, and the outcome value "2" 224 of the second rule 220a may be stored in the outcome column 207 of the second row 220b.

The second rule 220a includes three tests: "Year>=2018", "Make=Carmake", and "Model=Carmodel". Each of these tests includes a test variable ("Year", "Make", and "Model") and a comparison operator (">=" or "="). The tests of the second rule 220a include three combinations of a test variable and a comparison operator: "Year>=", "Make=", and "Model=". Several additional columns 202, 203, 204, 205, 206 may already be defined in the normalization grid 200 as a result of the transformation and representation of the first rule 210a received by the multi-lender architecture 100. The three tests of the second rule 220a may be transformed and represented in the second row 220b of the normalization grid 200. The comparison value "2018" 221 of the second rule 220a may be stored at the second additional column 203 associated with "Year>=". The comparison value "Carmake" 222 of the second rule 220a may be stored in the third additional column 204 associated with "Make=". The comparison value "Carmodel" 223 of the second rule 220a may be stored in the fourth additional column 205 associated with "Model=".

A third rule, assigned the unique identifier "Rule3" may be represented in a third row 230 of the normalization grid. A fourth rule, which may be a catch-all rule may be represented in a fourth row 240 of the normalization grid.

The normalization grid 200 may include an optional priority column 208. When multiple rules of the normalization grid 200 evaluate to true, the priority column 208 may be evaluated as a tie-breaker. In one non-limiting example of FIG. 2, the priority is indicated by an integer in the priority column 208 and the lower integer indicates a higher priority. In another non-limiting example, a higher priority may be indicated by a higher integer in the priority column 208. There are a variety of ways to indicate different priorities and the illustration of FIG. 2 is presented by way of example only and not meant to be exhaustive. According to some embodiments, the priority of the rules may be defined by the natural order of the rows in the normalization grid 200. As a non-limiting example, Rule 1 may have a higher priority than Rule2, which has a higher priority that Rule3, and so on.

FIG. 3 is a diagram illustrating a representation of several rules in the normalization grid 300 According to some embodiments disclosed herein. The normalization grid 300 of FIG. 3 includes a "unique identifier" column 301, an outcome column 306, and several additional columns 302, 303, 304, 305, each associated with a test variable and comparison operator. The non-limiting example normalization grid 300 illustrated in FIG. 3 includes three rows 310, 320, 330 representing three rules and a fourth row 340 representing a catch-all rule. A rule assigned the unique identifier "Rule1" may be represented in a first row 310 of the normalization grid 300, a rule assigned the unique identifier "Rule2" may be represented in a second row 320 of the normalization grid 300, and a rule assigned the unique identifier "Rule3" may be represented in a third row 330 of the normalization grid 300. The catch-all rule, "Rule_n", may be represented in a fourth row 340 with no comparison values stored in the additional columns 302, 303, 304, 305.

The first row 310 of the normalization grid 300, corresponding to the unique identifier "Rule1" includes a comparison value "640" 321 in a first additional column 302 associated with the test variable and comparison operator "FICO>=". Another comparison value "660" 322 is stored in the first row 310 at a second additional column 303 associated with the test variable and comparison operator "FICO<". The first row 310 also includes a comparison value "130" 323 stored in the third additional column 304 associated with the test variable and comparison operator "LTV<=". A comparison value "50000" is stored in the fourth additional column 305 associated with the test variable and comparison operator "Income>=". FICO 302, 303 is an acronym for Fair Isaac Corporation, a company that developed the FICO® credit score system, which generates a score based on consumers' credit usage activities. The FICO credit score is often used to predict consumers' ability to repay debt. LTV may refer to a loan-to-value ratio. A higher loan-to-value ratio may represent a higher risk and a higher cost of the loan to the borrower. Income may refer to an applicant's gross annual income. "Credit" in the outcome column 306 may correspond to an adjustment made to a base annual percentage rate (APR) in a lending offer. A higher "Credit" outcome may correspond to a higher final APR in a lending offer. The first row 310 also includes value 324 for the Income>305 column and value 325 for the Credit 306 column.

The rule assigned the unique identifier "Rule1" and represented in the first row 310 of the normalization grid 300 may be expressed as an IF THEN statement:

IF (FICO>=640, FICO<660, LTV<=130, Income>=50000)
THEN Credit=10

In a non-limiting example, the rule "Rule1" may be applied to an applicant's data, and the outcome of "Credit=10" may be applied in a lending decision or lending offer when the applicant's FICO score is between 640 and 660, the loan-to-value ratio is less than 130, and income is greater than or equal to $50,000. If any of the tests in "Rule1" fail to evaluate to true, the next rule may be evaluated, and this process may be repeated until a rule is satisfied.

In the third row 330 of the normalization grid 300, the rule assigned the name "Rule3" does not define any comparison value for the columns associated with "FICO>=" 302 or "FICO<" 303. The third row 330 defines LTV<=304, Income>306, and Credit 307 columns as shown by values 326-328 The rule represented in the third row 330 may be expressed as an IF THEN statement:

IF (LTV<=80, Income>=50000)
THEN Credit=30

According to some embodiments, when evaluating an applicant's data against "Rule3" represented by the third row 330, because the columns associated with "FICO>=" 302 and "FICO<" 303 are empty, there are no specific requirements for the applicant's FICO score.

Based on the principles illustrated in FIG. 2 and FIG. 3, a skilled person would understand that many different rules with many different tests and outcome variables may be represented in the normalization grid 200, 300. Any number of different criteria used in making lending decisions may be codified and represented in a normalization grid 200, 300 According to the embodiments disclosed herein. Rules relating to different outcome variables may be represented with different normalization grids 200, 300, or many rules with many different outcome variables may be represented in a single normalization grid 200, 300.

The normalization grid 300 may include an optional priority column 308. When multiple rules of the normalization grid 300 evaluate to TRUE, the priority column 308 may be evaluated as a tie-breaker. In one non-limiting example of FIG. 3, the priority is indicated by an integer in the priority column 308 and the lower integer indicates a higher priority. In the non-limiting example illustrated in FIG. 3, Rule1 has a priority of 2 and Rule2 has a priority of 1. If both rules evaluate to TRUE, the outcome of Rule2 would be applied to the lending decision. There are a variety of ways to indicate different priorities and the illustration of FIG. 3 is presented by way of example only and not meant to be exhaustive.

Figure 4:
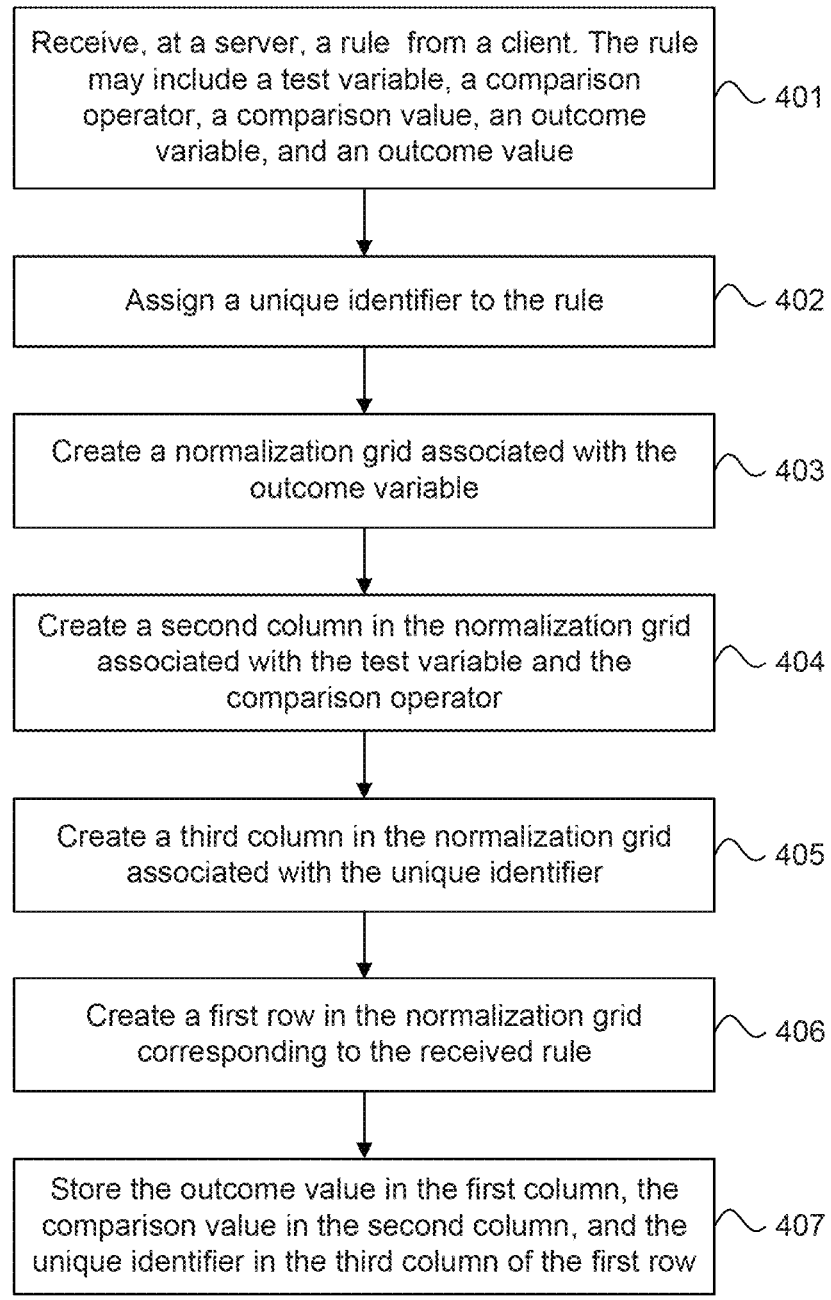
FIG. 4 is a flow chart illustrating steps for transforming rules into a common format according to some embodiments disclosed herein.

FIG. 4 is a flow chart illustrating steps for transforming rules into a common format According to some embodiments disclosed herein.

At step 401, the multi-lender architecture 100 may receive a rule from a client device. The client device may be operated by a lender 120. The received rule may include one or more tests, an outcome variable, and an outcome value. Each test in the received rule may include a test variable, a comparison operator, and a comparison value. The received rule may also include a unique identifier. If the received rule does not include a unique identifier, the multi-lender architecture 100 may assign a unique identifier to the received rule at step 402. The unique identifier uniquely identifies the rule, and any method of uniquely identifying the rule may operate as a unique identifier. According to some embodiments, the unique identifier may be a unique name, a unique number, or a unique sequence of alphanumeric characters assigned to the rule. According to some embodiments, a rule may be uniquely identified by the row in the normalization grid 200, 300 that represents the rule, and the creation of a unique identifier and a column associated with the unique identifier is optional.

At step 403, the multi-lender architecture 100 may create a first column 207, 306 in the normalization grid 200, 300 associated with the outcome variable. The columns of the normalization grid 200, 300, including the first column, need not have any particular position or order in the normalization grid 200, 300. The first column may be defined in the normalization grid 200, 300 by a header row that identifies the outcome variable from the received rule. The received rule may include multiple outcome variables, and a separate column may be created in the header row to identify each outcome variable included in the received rule.

At step 404, the multi-lender architecture 100 may create a second column 302, 303, 304, 305 in the normalization grid 200, 300. The second column 302, 303, 304, 305 may be associated with a test included in the received rule. The test may include a test variable and a comparison operator, and the second column may be associated with the test variable and the comparison operator of the test. The received rule may include one or more tests and each test may include a test variable, a comparison operator, and a comparison value. Each column that represents a test of the received rule may be uniquely associated with that test. The header row of the normalization grid 200, 300 may identify the test variable and the comparison operator in separate columns for each test included in the received rule. According to some embodiments, the header row may store the test variable and the comparison operator at the column corresponding to the test that includes the test variable and the comparison operator.

At step 405, According to some embodiments, the multi-lender architecture 100 may create a third column in the normalization grid associated with the unique identifier. The third column may be defined in the header row of the normalization grid.

At step 406, the multi-lender architecture 100 may create a first row in the normalization grid corresponding to the received rule. Each rule received by the multi-lender architecture 100 may be represented by a different row in the normalization grid 200, 300.

At step 407, the multi-lender architecture 100 may store the outcome value in the first column, the comparison value in the second column, and the unique identifier in the third column of the first row. The combination of the comparison value, stored in the second column of the first row, and the second column's association with the test variable and the comparison operator creates a complete representation of the test. Different rules may include tests that are similar. Similar tests may share the same test variable and comparison operator but differ in their comparison values. When a column associated with the test variable and the comparison operator already exists in the normalization grid 200, 300, the comparison values of similar tests may be stored in the same column at different rows corresponding to their respective rules.

Each column of the normalization 200, 300 grid may be uniquely associated with an outcome variable, a test variable and comparison operator combination, or the unique identifier. The columns of the normalization grid 200, 300 need not have any particular position or order in the normalization grid 200, 300. As a non-limiting example, all of the columns of the normalization grid may be represented in any order or position relative to the other columns without any effect on the rules represented by the normalization grid. As additional rules are transformed and represented in the normalization grid 200, 300, any additional outcome variable, not already represented in the normalization grid 200, 300, may trigger the creation of a new column associated with the additional outcome variable. Likewise, any additional test variable and comparison operator combination, not already associated with a column of the normalization grid, may trigger creation of a new column associated with the additional test variable and comparison operator combination.

Figure 5:
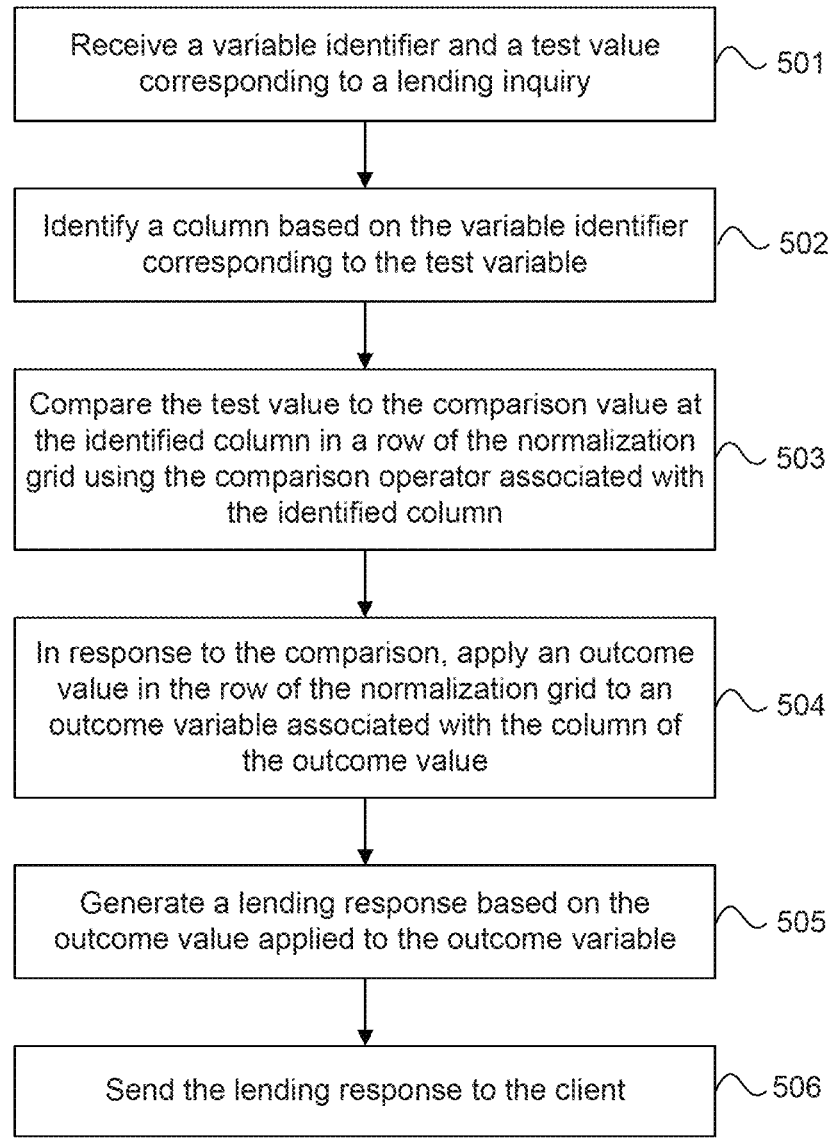
FIG. 5 is a flow chart illustrating steps for evaluating a test value corresponding to a lending inquiry according to some embodiments disclosed herein.

FIG. 5 is a flow chart illustrating steps for evaluating a test value corresponding to a lending inquiry According to some embodiments disclosed herein. A lending inquiry may include application data corresponding to an applicant. Application data may include personal information, location data, employment data, income data, collateral data, financial data, a credit score, or any other data a lender may use in order to evaluate a lending application. The credit score may be a FICO score or another score representing credit worthiness. Collateral data may be data related to the vehicle that provides collateral for the loan.

The multi-lender architecture 100 may evaluate the application data against the rules represented in the normalization grid 200, 300. Portions of the application data may correspond to a test variable associated with one or more columns of the normalization grid 200, 300. The multi-lender architecture 100 may substitute application data for test variables of the normalization grid and compare the application data to the comparison values stored in the normalization grid.

At step 501, the multi-lender architecture 100 may receive a variable identifier and a test value. The variable identifier may correspond to a test variable associated with one or more columns of the normalization grid. The test value may be the value which is substituted for the test variable in evaluating the rules represented in the normalization grid. The application data may include any number of variable identifiers and test values.

In a non-limiting first example, the multi-lender architecture 100 may receive application data that includes the following variable identifiers and test values:

| Variable Identifier | Test Value |
|---|---|
| FICO | 615 |
| LTV | 75.5 |
| Income | 60000 |

Receiving the application data may include receiving the "FICO" variable identifier and the test value "615". The multi-lender architecture 100 may receive any number of variable identifiers and test values.

At step 502, the multi-lender architecture 100 may identify a column associated with a test variable based on the variable identifier. The variable identifier may identify a test variable associated with one or more columns of the normalization grid. According to some embodiments, the multi-lender architecture 100 may match the variable identifier with the test variable and identify the column associated with the test variable that matches the variable identifier. Matching may be performed by text comparison, comparison of unique identifiers that represent the test variables and comparison operators, comparison of hash values of the test variables and comparison operators, or any method of representing and comparing values known in the art. A test variable may be associated with more than one column of the normalization grid and each column associated with a particular test variable may be associated with a different comparison operator.

In the non-limiting first example, referring to the normalization grid 300 illustrated in FIG. 3, the multi-lender architecture 100 may identify the column associated with "FICO>=" 302 based on the test variable "FICO" matching the variable identifier "FICO".

At step 503, the multi-lender architecture 100 may compare the test value to the comparison value at the identified column in a row of the normalization grid 200, 300, using the comparison operator associated with the identified column. Multiple rules may be each represented in a separate row of the normalization grid 200, 300. According to some embodiments, rows of the normalization grid 200, 300 may be sorted by the outcome value in ascending or descending order. According to some embodiments, rows of the normalization grid 200, 300 may be sorted According to the number of columns storing a comparison value.

In the first example, again referring to the normalization grid 300, the multi-lender architecture 100 may evaluate the expression "FICO>=640" represented by the first row 310 and the column associated with "FICO>=". The test variable is FICO, the comparison operator is ">=" and the comparison value is "640". The multi-lender architecture 100 may substitute the received test value, "615", for the test variable, "FICO", so that the expression becomes "615>=640". Because 615 is not less than or equal to 640, the expression evaluates to FALSE.

According to some embodiments, the multi-lender architecture 100 may evaluate the rules represented in the normalization grid According to the order of the rows in the normalization grid. At each row, the multi-lender architecture 100 may substitute an appropriate test value for the test variable associated with each column where a comparison value is stored. Each column where a comparison value is stored may represent a test that defines a comparison to be made between the substituted test value and the comparison value using the comparison operator associated with the column. In this manner, the multi-lender architecture 100 may evaluate any number of rules represented in the normalization grid, each rule having any number of tests, including zero tests.

In the first example, because the first rule represented by the first row 310 has already evaluated to FALSE, the multi-lender architecture 100 may proceed to the second row 320. In the second row, the multi-lender architecture 100 may again identify the column associated with "FICO>=" 302, and substitute the test value, "615" for the test variable "FICO" to create the expression "615>=620". Because 615 is not greater than or equal to 620, the evaluation of the rule represented by the second row 320 also produces a logical FALSE. The multi-lender architecture 100 may then proceed to the third row 330.

In the third row 330, no comparison value is stored in the "FICO>=" column 302 or the "FICO<" column 303 and the test value of "615" associated with the "FICO" variable identifier is not used in evaluating "Rule3" represented by the third row 330. In the first example, the multi-lender architecture 100 may identify the column associated with "LTV<=" 304, based on matching the variable identifier "LTV" with the test variable "LTV" associated with the "LTV<=" column 304. The multi-lender architecture 100 may substitute the test value, "75.5", corresponding to the test variable "LTV" in the expression "LTV<=80" to produce the expression "75.5<=80". Because 75.5 is less than 80, the test represented by the third row 330 at the "LTV<=" column 304 evaluates to TRUE.

According to some embodiments, a rule may be satisfied when each test included in the rule evaluates to TRUE. The multi-lender architecture 100 may proceed to evaluate the test in the third row 330 represented by the "Income>=" column 305. Because the test value "60000" corresponding to the variable identifier "Income" is greater than the comparison value "50000" in the third row 330, the test associated with the "Income>=" column 305 also evaluates to TRUE. In the first example, the rule represented by the third row 330, evaluates to TRUE.

At step 504, in response to the comparison performed at step 503, the multi-lender architecture 100 may apply an outcome value in the row of the normalization grid to an outcome variable associated with the column of the outcome value. According to some embodiments, in response to each test in a rule evaluating to TRUE, the multi-lender architecture 100 may discontinue further evaluation of rules and apply one or more outcome values from the row representing the rule to their respective outcome variables.

In the first example, the multi-lender architecture 100 may apply the outcome of "30" 328 to the "Credit" outcome variable in the outcome column 306.

At step 505, the multi-lender architecture 100 may generate a lending response based on the outcome value applied to the outcome variable. According to some embodiments, the "Credit" outcome variable may correspond to an adjustment made to a base APR. According to one non-limiting example, the base APR may be 1.0%, and each point in the "Credit" outcome variable may represent a tenth of a percentage point added to the base APR. In the first example, the APR of the lending response may be adjusted to 4.0% based on the rule of the third row 330 evaluating to TRUE.

At step 506, multi-lender architecture 100 may send the lending response to the applicant. The lending response may be sent to the client according to any method described in relation to the multi-lender architecture.

The normalization grid 200, 300 may include an optional priority column 208, 308. When multiple rules of the normalization grid 200, 300 evaluate to TRUE, the priority column 208, 308 may be evaluated as a tie-breaker as described in relation to FIG. 2 or FIG. 3.

Figure 6:
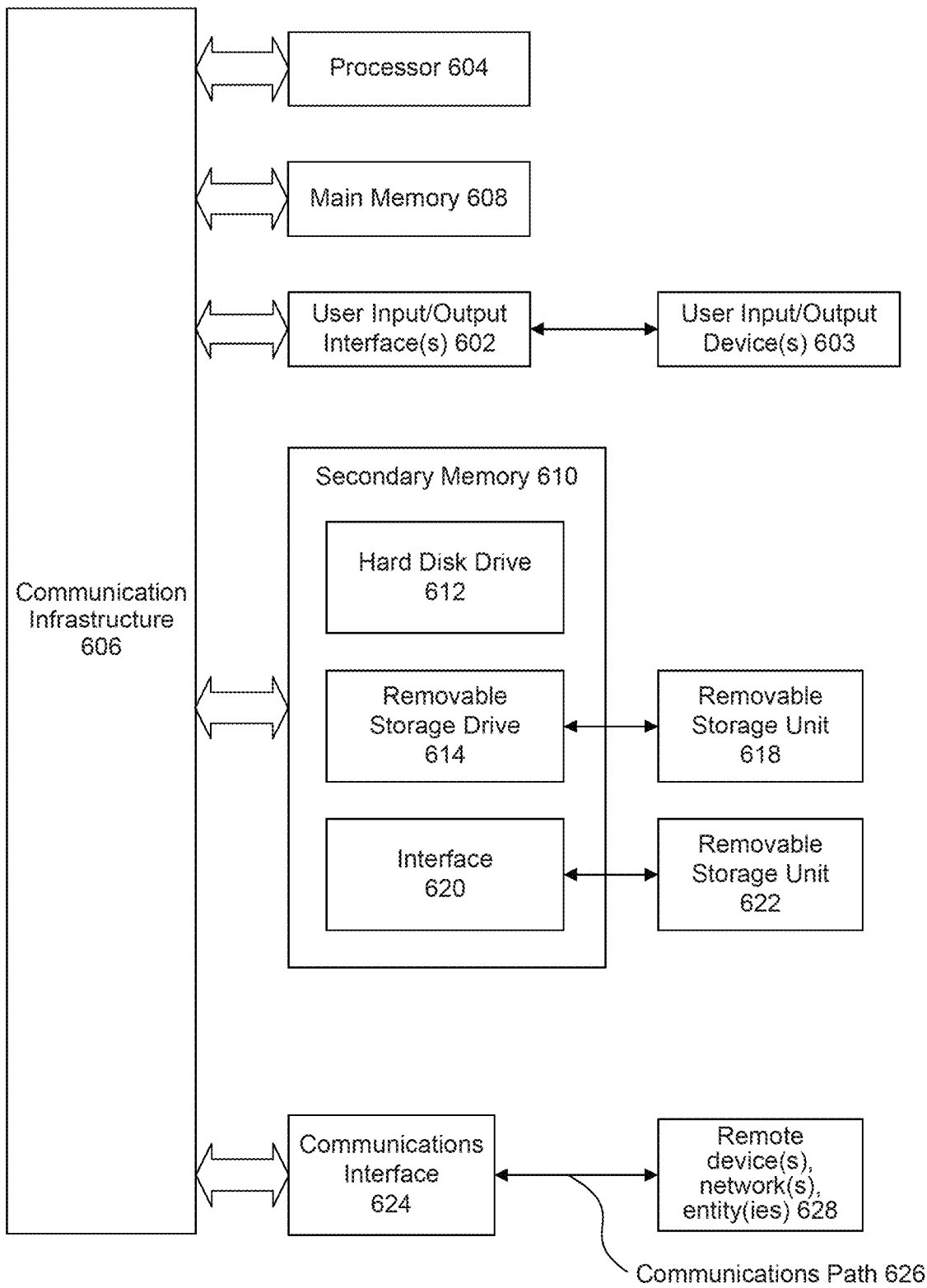
FIG. 6 is a block diagram of a non-limiting example computer system useful for implementing various embodiments disclosed herein.

FIG. 6 is a block diagram of a non-limiting example computer system useful for implementing various embodiments disclosed herein. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/or any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communications interface 624 may enable computer system 600 to communicate and interact with any combination of external devices, external networks, external entities, etc. (individually and collectively referenced by reference number 628). For example, communications interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of transforming rules into a common format, the method comprising:

decrypting, by a computing device, based on an encryption key associated with an entity, encrypted rule information determined by the entity;

identifying, based on the decrypted rule information, a test for a rule, an outcome variable, and an outcome value for the rule, wherein the rule indicates that the outcome value is dependent on satisfaction of the test;

transforming the rule into a normalization grid by:
splitting the test into a test variable, a comparison operator, and a comparison value;
generating a column comprising the test variable and the comparison operator in a header row;
generating a row corresponding to the rule, the row comprising the comparison value in the column corresponding to the test variable and the comparison operator; and
generating a column comprising the outcome variable in the header row, wherein the row further comprises the outcome value in the column corresponding to the outcome variable;

generating, based on user data received from a user device with a request for a transaction, an output of the normalization grid comprising the outcome value in response to the user data satisfying the test based on the test variable, the comparison operator, and the comparison value in the normalization grid; and sending to the user device, based on the output of the normalization grid, an indication that the transaction is authorized or denied.

2. The method of claim 1, further comprising:
adding another row to the normalization grid corresponding to another rule;
evaluating the data according to a defined sequence of the rule and the another rule; and
generating another output in response to the rule or the another rule being satisfied by a test value and a variable identifier.

3. The method of claim 1, wherein the rule further comprises another comparison operator and another comparison value, the normalization grid further comprises a column associated with the test variable and the another comparison operator, and the row further comprises the another comparison value in the column associated with the test variable and the another comparison operator.

4. The method of claim 1, further comprising receiving, based on an interaction with a user interface of an application for evaluating user-related data, the user data.

5. The method of claim 4, wherein the encrypted rule information indicates a date and time to start implementing the rule.

6. The method of claim 1, wherein the normalization grid comprises additional rules associated with additional entities and a respective test for each rule of the additional rules.

7. The method of claim 6, wherein the output of the normalization grid further comprises additional outcome values based on the user data satisfying one or more additional tests of the additional rules, the method further comprising determining that the user data satisfies the test for the rule and the one or more additional tests of the additional rules in parallel.

8. A system of transforming rules into a common format, the system comprising:
a memory;
a processor coupled to the memory and configured to perform operations comprising:
decrypting, based on an encryption key associated with an entity, encrypted rule information determined by the entity;
identifying, based on the decrypted rule information, a test for a rule, an outcome variable, and an outcome value for the rule, wherein the rule indicates that the outcome value is dependent on satisfaction of the test;
transforming the rule into a normalization grid by:
splitting the test into a test variable, a comparison operator, and a comparison value;
generating a column comprising the test variable and the comparison operator in a header row;
generating a row corresponding to the rule, the row comprising the comparison value in the column corresponding to the test variable and the comparison operator; and
generating a column comprising the outcome variable in the header row, wherein the row further comprises the outcome value in the column corresponding to the outcome variable;
generating, based on user data received from a user device with a request for a transaction, an output of the normalization grid comprising the outcome value in response to the user data satisfying the test based on the test variable, the comparison operator, and the comparison value in the normalization grid; and
sending to the user device, based on the output of the normalization grid, an indication that the transaction is authorized or denied.

9. The system of claim 8, wherein the operations further comprise:
adding another row to the normalization grid corresponding to another rule;
evaluating the data according to a defined sequence of the rule and the another rule; and
generating another output in response to the rule or the another rule being satisfied by a test value and a variable identifier.

10. The system of claim 8, wherein the rule further comprises another comparison operator and another comparison value, the normalization grid further comprises a column associated with the test variable and the another comparison operator, and the row further comprises the another comparison value in the column associated with the test variable and the another comparison operator.

11. The system of claim 8, the operations further comprising receiving, based on an interaction with a user interface of an application for evaluating user-related data, the user data.

12. The system of claim 11, wherein the encrypted rule information indicates a date and time to start implementing the rule.

13. The system of claim 8, wherein the normalization grid comprises additional rules associated with additional entities and a respective test for each rule of the additional rules.

14. The system of claim 13, wherein the output of the normalization grid further comprises additional outcome values based on the user data satisfying one or more additional tests of the additional rules, the operations further comprising determining that the user data satisfies the test for the rule and the one or more additional tests of the additional rules in parallel.

15. A non-transitory computer-readable medium having instructions stored thereon that, when executed by at least one computing device, cause the at least one computing device to perform operations comprising:
decrypting, based on an encryption key associated with an entity, encrypted rule information determined by the entity;
identifying, based on the decrypted rule information, a test for a rule, an outcome variable, and an outcome value for the rule, wherein the rule indicates that the outcome value is dependent on satisfaction of the test;
transforming the rule into a normalization grid by:
splitting the test into a test variable, a comparison operator, and a comparison value;
generating a column comprising the test variable and the comparison operator in a header row;
generating a row corresponding to the rule, the row comprising the comparison value in the column corresponding to the test variable and the comparison operator; and
generating a column comprising the outcome variable in the header row, wherein the row further comprises the outcome value in the column corresponding to the outcome variable;
generating, based on user data received from a user device with a request for a transaction, an output of the normalization grid comprising the outcome value in response to the user data satisfying the test based on the test variable, the comparison operator, and the comparison value in the normalization grid; and
sending to the user device, based on the output of the normalization grid, an indication that the transaction is authorized or denied.

16. The non-transitory computer-readable medium of claim 15, the operations further comprising:
adding another row to the normalization grid corresponding to another rule;
evaluating the user data according to a defined sequence of the rule and the another rule; and
generating another output in response to the rule or the another rule being satisfied by a test value and a variable identifier.

17. The non-transitory computer-readable medium of claim 15, wherein the rule further comprises another comparison operator and another comparison value, the normalization grid further comprises a column associated with the test variable and the another comparison operator, and the row further comprises the another comparison value in the column associated with the test variable and the another comparison operator.

18. The non-transitory computer-readable medium of claim 15, the operations further comprising receiving, based on an interaction with a user interface of an application for evaluating user-related data, the user data.

19. The non-transitory computer-readable medium of claim 15, wherein the normalization grid comprises additional rules associated with additional entities and a respective test for each rule of the additional rules.

20. The non-transitory computer-readable medium of claim 19, wherein the output of the normalization grid further comprises additional outcome values based on the data satisfying one or more additional tests of the additional rules, and wherein determining that the user data satisfies the test for the rule and the one or more additional tests of the additional rules in parallel.

* * * * *